US010402865B2

(12) United States Patent
Gao et al.

(10) Patent No.: US 10,402,865 B2
(45) Date of Patent: Sep. 3, 2019

(54) DETERMINING WHETHER TO MAINTAIN INFORMATION DESCRIBING A GROUP OF ONLINE SYSTEM USERS SPECIFIED BY A THIRD-PARTY SYSTEM BASED ON REVENUE FROM CONTENT SELECTION BASED ON THE GROUP

(71) Applicant: Facebook, Inc., Menlo Park, CA (US)

(72) Inventors: Yunzhi Gao, Menlo Park, CA (US); Li Zhou, Campbell, CA (US); Ian K. Abernathy, Austin, TX (US); Michael Phillip Salem, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 771 days.

(21) Appl. No.: 14/586,673

(22) Filed: Dec. 30, 2014

(65) Prior Publication Data

US 2016/0048882 A1 Feb. 18, 2016

Related U.S. Application Data

(63) Continuation-in-part of application No. 14/461,361, filed on Aug. 15, 2014.

(51) Int. Cl.
*G06Q 30/02* (2012.01)
(52) U.S. Cl.
CPC ..... *G06Q 30/0269* (2013.01); *G06Q 30/0247* (2013.01); *G06Q 30/0277* (2013.01)
(58) Field of Classification Search
CPC .............................................. G06Q 30/0247
See application file for complete search history.

(56) References Cited

U.S. PATENT DOCUMENTS

| 8,762,193 B2* | 6/2014 | Maga ............... G06Q 10/06375 |
| | | 705/7.31 |
| 2007/0112615 A1 | 5/2007 | Maga et al. |
| 2011/0153412 A1 | 6/2011 | Novikov et al. |
| 2011/0153421 A1 | 6/2011 | Novikov et al. |
| 2012/0116868 A1* | 5/2012 | Chin ................. G06Q 30/0203 |
| | | 705/14.43 |
| 2013/0110641 A1 | 5/2013 | Ormont et al. |
| 2014/0156385 A1 | 6/2014 | Smallwood et al. |

(Continued)

OTHER PUBLICATIONS

"Social media analytics: a survey of techniques, tools and platforms", by Bogdan et al. AI & Society, vol. 30, Issue 1, pp. 89- 116. Feb. 2015 (Year: 2015).*

(Continued)

*Primary Examiner* — William A Brandenburg
(74) *Attorney, Agent, or Firm* — Fenwick & West LLP

(57) ABSTRACT

An online system receives information describing a target group of online system users from a third party system and stores the information describing the target group. The online system subsequently uses the target group to select content for presentation to one or more users. For example, users included in the target group are identified as eligible to be presented with content items. Based on revenue obtained by the online system from presenting content based on the target group, the online system determines a monetization value for the target group. The online system determines whether to continue storing the information describing the target group based on the monetization value.

11 Claims, 2 Drawing Sheets

(56) References Cited

U.S. PATENT DOCUMENTS

| | | |
|---|---|---|
| 2014/0214545 A1 | 7/2014 | Zhang et al. |
| 2015/0134401 A1 | 5/2015 | Heuer et al. |
| 2015/0220939 A1* | 8/2015 | Tay .................... G06Q 30/0201 |
| | | 705/7.29 |
| 2016/0019595 A1 | 1/2016 | Wu et al. |

OTHER PUBLICATIONS

"The business of conversations: Market social media surveillance and visibility", by Daniel Trotter. First Monday Peer-Reviewed Journal on the Internet, vol. 18, No. 2, Feb. 4, 2013. (Year: 2013).*
United States Office Action, U.S. Appl. No. 14/461,361, dated Sep. 29, 2016, 28 pages.
United States Office Action, U.S. Appl. No. 14/461,361, dated Jul. 21, 2017, 36 pages.
United States Office Action, U.S. Appl. No. 14/461,361, dated Jun. 11, 2018, eighteen pages.
Batrinca, B. et al., "Social media analytics: a survey of techniques, tools and platforms,", *AI & Society*, Feb. 2015, pp. 89-116, vol. 30, Issue 1. [Online] [Retrieved Mar. 28, 2019] Retrieved from the Internet <URL:https://link.springer.com/article/10 .1007/s00146-014-0549-4.>.
Trottier, D., "The business of conversations: Market social media surveillance and visibility," *First Monday Peer-Reviewed Journal on the Internet*, Feb. 4, 2013 vol. 18, No. 2. [Online] [Retrieved Mar. 28, 2019] Retrieved from the Internet <URL:https://journals.uic.edu/ojs/index.php/fm/article/view/3930/3413.>.
United States Office Action, U.S. Appl. No. 14/461,361, dated Jan. 31, 2019, twenty-three pages.

* cited by examiner

DETERMINING WHETHER TO MAINTAIN INFORMATION DESCRIBING A GROUP OF ONLINE SYSTEM USERS SPECIFIED BY A THIRD-PARTY SYSTEM BASED ON REVENUE FROM CONTENT SELECTION BASED ON THE GROUP

CROSS REFERENCE TO RELATED APPLICATIONS

This application is a continuation-in-part of co-pending U.S. patent application Ser. No. 14/461,361, filed Aug. 15, 2014, which is incorporated by reference in its entirety.

BACKGROUND

This disclosure relates generally to identifying users of an online system, and more particularly to maintaining information describing groups of online system users specified by a third party system.

An online system allows users to connect to and to communicate with other users of the online system. Users create profiles on an online system that are tied to their identities and include information about the users, such as interests and demographic information. The users may be individuals or entities such as corporations or charities. Content items are presented to various users by the online system to encourage users to interact with the online system.

But as the amount of content provided by the online system increases, users may be presented with an increasing amount of content in which the users have little interest. To provide users with content more likely to be relevant, content items may be associated with targeting criteria specifying characteristics of users eligible to be presented with the content item. This limits presentation of a content item to users having characteristics satisfying the targeting criteria.

While the online system maintains targeting criteria for identifying groups of users satisfying various targeting criteria, a third party system may provide information to the online system identifying groups of online system users. Conventional online systems merely store information from third party systems identifying groups of users, allowing a third party system to identify a group of users to receive content. However, groups identified by a third party system may be duplicative of groups the online system may identify based on locally-maintained targeting criteria, limiting the usefulness to the online system of storing information identifying the group.

SUMMARY

An online system receives information from a third party system describing a target group that includes multiple users of the online system. Identifying a target group allows the third party system to specify a customized group of online system users to receive content. Information describing the target group may identify specific users of the online system or may include information specifying one or more characteristics of users of the online system in the target group. The online system stores the received information describing the target group and determines whether to continue storing the information describing the target group by determining a monetization value for the target group when the target group is used to select content for presentation to one or more users.

For example, a content item is associated with targeting criteria that specifies the target group, so the content item is eligible to users who are included in the target group but not eligible for presentation to users who are not included in the target group. Targeting criteria associated with a content item may specify multiple target groups or combinations of target groups to further refine users eligible to be presented with the content item. For example, targeting criteria associated with a content item specifies a combination of target groups stored by the online system, so the content item is eligible for presentation to users included in the combination of target groups but is not eligible for presentation to users included in less than the combination of target groups. Content items eligible for presentation to a user are included in a selection process performed by the online system that selects one or more of the content items eligible for presentation to the user. The selected content items are then presented to the user The online system may receive revenue when a content item is presented to users. When a content item is eligible for presentation to a user because the user is included in the target group and the content item is presented to the user, the online system determines a monetization value for the target group based at least in part on the amount of revenue received from presentation of the content item. For example, the monetization value for the target group is a total amount of revenue received by the online system during a time interval from presenting content items eligible for presentation to users because the users were included in the target group. As another example, the monetization value is an average amount of revenue received by the online system during the time interval from presenting content items eligible for presentation to users because the users were included in the target group. However, any suitable method may be used to determine the monetization value for the target group. When determining the monetization value for the target group, if a content item specifies multiple targeting groups, the amount of revenue received by the online system from presenting the content item is divided among the targeting groups. The portion of the amount of revenue allocated to a targeting group is then used when determining the monetization value of the target group. If the monetization value is less than a threshold amount, the information describing the target group is removed by the online system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
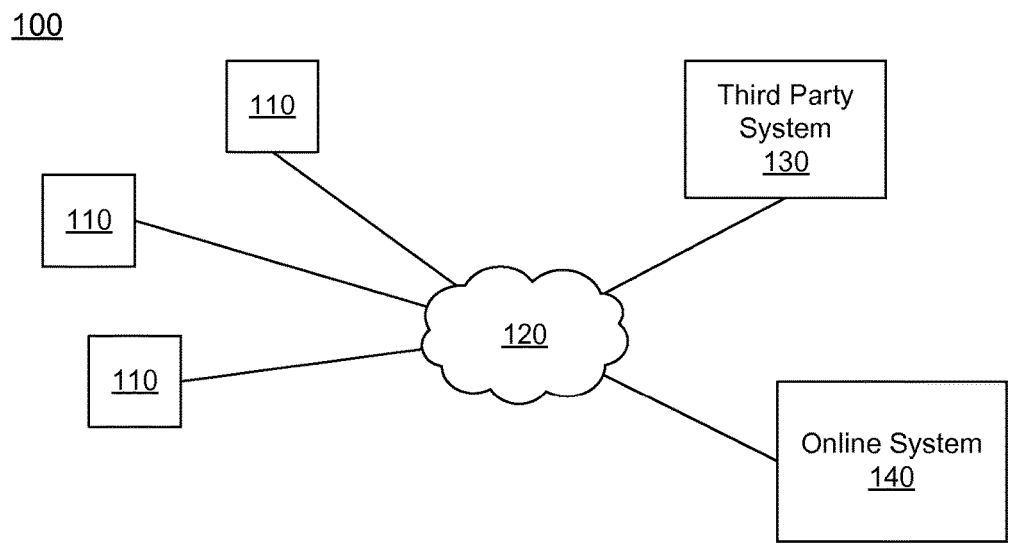
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, information describing a group of users of the online system 140, or information about an application provided by the third party system 130. In some embodiments, a third party system 130 may communicate information directly to the online system 140.

Figure 2:
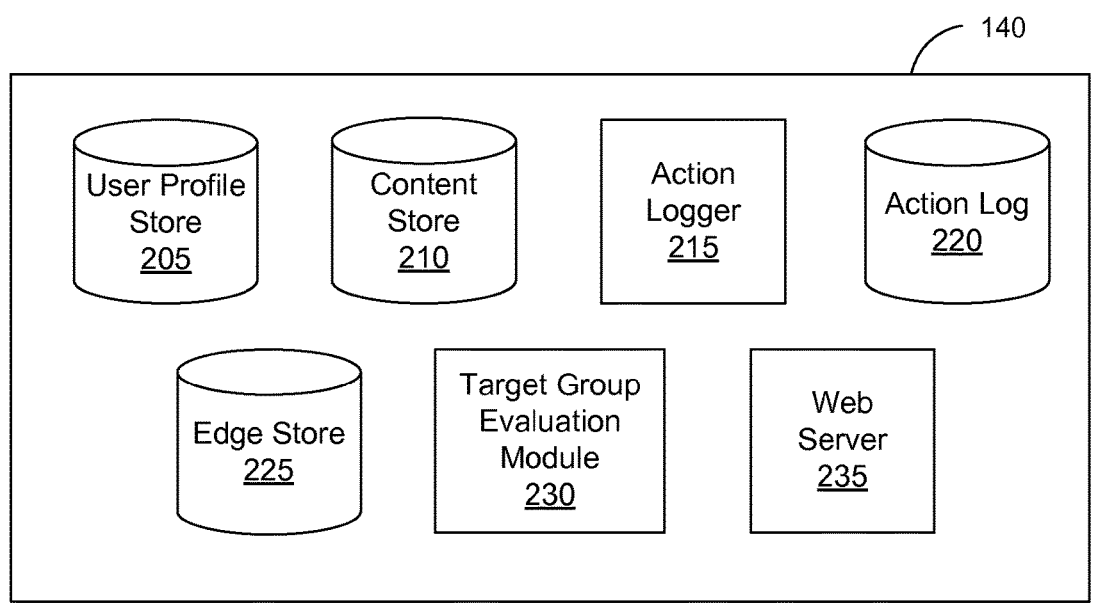
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, a target group evaluation module 230 and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220. In some embodiments, a third party system 130 may indirectly retrieve information from the user profile store 205, subject to one or more privacy settings associated with a user profile by a user, to identify a user profile in the user profile store 205 associated with a user of the third party system 130.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The target group evaluation module 230 receives information from a third party system 130 describing a target group that includes multiple users of the online system 140, allowing the third party system 130 to identify a target group including various online system users to the online system 140. Information describing the target group may identify specific users of the online system 140 or may include information specifying one or more characteristics of users of the online system 140 in the target group. The target group evaluation module 230 stores information describing the target group and determines whether to continue storing the information describing the target group by determining a monetization value for the target group as the target group is used to select content for presentation to one or more users. In various embodiments, the monetization value is determined from an amount of revenue received by the online system 140 from content items presented to users in the target group. If the monetization value is less than a threshold amount, the information describing the target group is removed by the target group evaluation module 230, as further described below in conjunction with FIG. 3.

The web server 235 links the online system 140 via the network 120 to the one or more client devices 110, as well as to the one or more third party systems 130. In some embodiments, the web server 235 links the online system 140 directly ton one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Maintaining User Groups Specified by a Third-Party System

Figure 3:
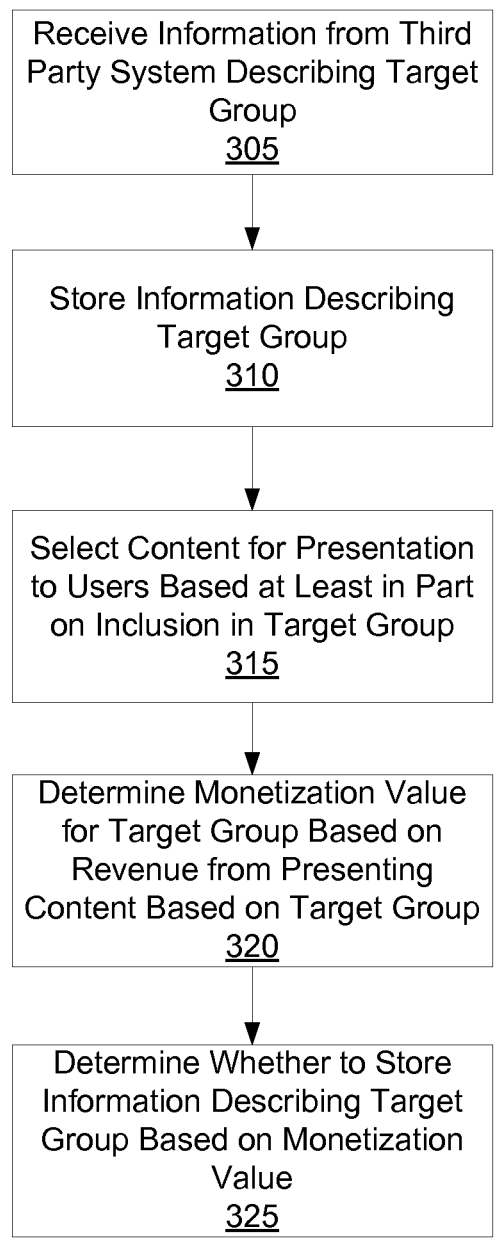
FIG. 3 is a flow chart of a method for maintaining groups of online system users specified by a third party system in an online system, in accordance with an embodiment.

FIG. 3 is a flow chart of a method for maintaining a group of users provided by a third party system 130 in an online system 140. In other embodiments, the method may include different and/or additional steps than those described in conjunction with FIG. 3. Additionally, in some embodiments, the method may perform the steps described in conjunction with FIG. 3 in different orders.

The online system 140 receives 305 information from a third party system 130 that describes a target group that includes multiple users of the online system 140. In one embodiment, the online system 140 receives 305 a target group identifier associated with the target group and user identifying information associated with users of the online system 140 included in the group. For example, the target group identifier is associated with email addresses, online system user identifiers, or any other type of information capable of identifying individual users of the online system 140. As another example, the online system 140 receives 305 a target group identifier associated with one or more characteristics of online system users from the third party system 140; in this example, the target group includes online system users having at least a threshold number of the characteristics.

The information describing the target group is stored 310 by the online system 140, which selects 315 content for presentation to users based at least in part on whether the users are included in the target group. For example, a content item is associated with targeting criteria that specifies the target group, so the content item is eligible to users who are included in the target group but not eligible for presentation to users who are not included in the target group. Targeting criteria associated with a content item may specify multiple target groups or combinations of target groups to further refine users eligible to be presented with the content item. For example, targeting criteria associated with a content item specifies a combination of target groups stored by the online system 140, so the content item is eligible for presentation to users included in the combination of target groups but is not eligible for presentation to users included in less than the combination of target groups. Content items eligible for presentation to a user are included in a selection process performed by the online system 140 that selects one or more of the content items eligible for presentation to the user. The selected content items are then presented to the user.

As content is selected for presentation to users based at least in part on whether the user is included in the target group, the online system 140 may determine whether to continue to store 310 the information describing the target group based on presentation of content items associated with targeting criteria identifying the target group. If the online system 140 receives compensation for presenting content items to users included in the target group (e.g., advertisements specifying inclusion in the target group in targeting criteria), the online system 140 determines 320 a monetization value for the target group based on an amount of revenue received by the online system 140 from presenting content items to users because the users are included in the target group. For example, the online system 140 determines 320 the monetization value as an average revenue received by the online system 140 over a time interval for presenting content items to users based on the users' inclusion in the target group. As another example, the online system 140 determines 320 the monetization value as a total amount of revenue received by the online system 140 during a time interval for presenting content items to users based on the users' inclusion in the target group.

When determining 320 the monetization value for the target group, the online system 140 may allocate revenue received by the online system 140 from presenting a content item among multiple target groups specified by targeting criteria associated with the content item. For example, if the content item is eligible for presentation to a user because the user is included in multiple target groups, the amount of revenue received by the online system from presenting the content item is allocated among each of the target groups. In one embodiment, the amount of revenue received by the online system 140 is divided by the number of target groups in the targeting criteria including the user to generate a value, with each target group including the user allocated the value from dividing the amount of revenue by the number of target groups. However, in other embodiments, the amount of revenue received by the online system 140 from presenting a content item may be allocated amount multiple target groups including the user and specified by targeting criteria associated with the content item using any suitable method. When determining 320 the monetization value for the target group, the amount of revenue received by the online system 140 allocated to the target group for presenting a content item is used rather than the total amount of revenue received by the online system 140 for presenting the content item.

The online system 140 may also account for revenue received from presenting content items to users because the users are included in the target group during different time intervals when determining 320 the monetization value for the target group X. In one embodiment, the online system 140 identifies a time interval (T1) and an additional time interval (T2), where T1 occurs more recently than T2 interval. For example, the T1 is one week from (e.g., 1-7 days prior to) a current time, while T2 is between two weeks and one week from (e.g., 8-14 days prior to) the current time. For a given advertiser, the online system 140 determines (i) an amount of revenue (R1) received during T1 from presenting content items to users because the users are included in the target group X and (ii) an additional amount of revenue (R2) received during T2 from presenting content items to users because the users are included in the target group X. In various embodiments, to determine 320 the monetization score, the online system 140 identifies a (1) minimum of (i) the R1 and (ii) R2 and (2) determines a ratio of the identified minimum to R2. The online system 140 then determines 320 the monetization value as a difference between a value (e.g., 1) and the determined ratio (i.e., the monetization score). In some embodiments, the monetization value corresponds to the weighted churn rate (or attrition rate) of the use of the target group X by the advertiser. For example, if R1 is greater than or equal to R2, there is no churn. In other words, the advertiser did not reduce or eliminate the use of the target group X for the advertiser's advertising campaigns. If R1 is less than R2, the advertiser reduced or eliminated the use of the target group X for the advertiser's advertising campaigns and the monetization value represents the weighted churn rate of the use of the target group X for the advertiser's advertising campaigns.

In additional embodiments, the online system 140 determines 320 the monetization value based on one or more of: a total revenue to the online system 140 for presenting content to users in the target group during a time interval, an average revenue to the online system 140 for presenting content to users in the target group over the time interval, a total number of content items associated with targeting criteria specifying inclusion in the target group presented to users in the target group during the time interval, and an average number of content items associated with targeting criteria specifying inclusion in the target group presented to users in the target group during the time interval. The online system 140 may determine 320 the monetization value as a square root of a product of an average revenue to the online system 140 for presenting content to users in the target group over the time interval, a total number of content items associated with targeting criteria specifying inclusion in the target group presented to users in the target group during the time interval, and an average number of content items associated with targeting criteria specifying inclusion in the target group presented to users in the target group during the time interval.

Based on the monetization value for the target group, the online system 140 determines 325 whether to continue storing 310 the information describing the target group. For example, if the monetization value equals or exceeds a threshold value, the online system 140 continues storing 310 the information describing the online system 140. However, if the monetization value is less than the threshold amount, the online system 140 discards the information describing the target group.

The online system 140 may periodically determine 320 the monetization value for the target group to determine 325 whether to continue storing the information describing the target group. Alternatively, the online system 140 determines 320 the monetization value associated with the target group when a content item identifying inclusion in the target group as targeting criteria is presented to one or more users included in the target group. Determining a monetization value associated with the target group allows the online system 140 to maintain information describing target groups providing at least a threshold amount of revenue to the online system 140 while discarding information describing target groups that do not provide sufficient revenue to the online system 140.

SUMMARY

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:
1. A method comprising:
maintaining, at an online system, a plurality of target groups of users of the online system, each target group being defined by user characteristics satisfying one or more targeting criteria for the target group;
receiving, at the online system, a new target group from a third party system, the new target group including a plurality of users of the online system;
storing, at the online system, the new target group in memory of the online system;
presenting content items to users of the online system based on the users satisfying the one or more targeting criteria for being included in at least one of the plurality of target groups including the new target group;
periodically, determining a monetization value for each target group of the plurality of target groups including the new target group, wherein the monetization value for each the target group is determined by:
determining an amount of revenue to the online system during a first time interval from presenting the content items to users in the target group, the amount of revenue being divided by a number of the plurality of target groups that each target a content item of the content items to users in the target group during the first time interval;

determining an additional amount of revenue to the online system during an additional time interval from presenting the content items to additional users in the target group, the additional amount of revenue being divided by a number of the plurality of target groups including the new target group that each target a content item of the content items to the additional users in the target group during the additional time interval, the additional time interval occurring more recently than the first time interval;

identifying a minimum of the amount of revenue and the additional amount of revenue;

determining a ratio of the identified minimum to the additional amount of revenue;

determining the monetization value based at least in part on the determined ratio, the monetization value corresponding to a churn rate of use of the target group;

responsive to the monetization value for the target group being greater than at least a threshold value, continue maintaining, by the online system, the target group in the memory of the online system; and responsive to the monetization value for the target group being less than the threshold value, removing the target group from the memory of the online system.

2. The method of claim 1, wherein determining the monetization value associated with the target group comprises:

determining whether the content was selected for presentation to a user because the user was included in the target group and included in the new target group;

allocating portions of an amount of revenue to the online system from presenting the content items to the user among the target group and the new target group; and determining the monetization value associated with the target group based at least in part on a portion of the amount of revenue to the online system from presenting the content to the user allocated to the target group.

3. The method of claim 2, wherein allocating portions of the amount of revenue to the online system from presenting the content items to the user among the target group and the new target group comprises:

determining total number of target groups that include the user based on the target group and the new target group;

generating a value by dividing the amount of revenue to the online system from presenting the content items to the user by the total number of target groups; and allocating the value to the target group.

4. The method of claim 3, wherein allocating portions of the amount of revenue to the online system from presenting the content to the user among the target group and the new target group further comprises:

allocating the value to the new target group.

5. The method of claim 1, wherein the monetization value is determined based at least in part on one or more selected from a group consisting of: a total revenue to the online system during a time interval from presenting content items identifying users in the target group as eligible to be presented with the content items, an average revenue to the online system during a time interval from presenting content items identifying users in the target group as eligible to be presented with the content items, a total number of content items identifying users in the target group as eligible to be presented with the content items presented to users in the target user during the time interval, an average number of content items identifying users in the target group as eligible to be presented with the content items presented to a user in the target user during the time interval, and any combination thereof.

6. The method of claim 1, wherein determining the monetization value based at least in part on the determined ratio comprises:

determining the monetization value as a difference between a value and the determined ratio.

7. A computer program product comprising a non-transitory computer readable storage medium having instructions encoded thereon that, when executed by a processor, cause the processor to:

maintain, at an online system, a plurality of target groups of users of the online system, each target group being defined by user characteristics satisfying one or more targeting criteria for the target group;

receive, at the online system, new target group from a third party system, the new target group including a plurality of users of the online system;

store, at the online system, the new target groups the new target group in memory of the online system;

present content items to users of the online system based on the users satisfying the one or more targeting criteria for being included in at least one of the plurality of target groups including the new target group;

periodically, determine a monetization value for each target group of the plurality of target groups including the new target group, wherein the monetization value for each the target group is determined by:

determining an amount of revenue to the online system during a first time interval from presenting the content items to users in the target group, the amount of revenue being divided by a number of the plurality of target groups that each target a content item of the content items to users in the target group during the first time interval;

determining an additional amount of revenue to the online system during an additional time interval from presenting the content items to additional users in the target group, the additional amount of revenue being divided by a number of the plurality of target groups including the new target group that each target a content item of the content items to the additional users in the target group during the additional time interval, the additional time interval occurring more recently than the first time interval;

identifying a minimum of the amount of revenue and the additional amount of revenue;

determining a ratio of the identified minimum to the additional amount of revenue;

determining the monetization value based at least in part on the determined ratio, the monetization value corresponding to a churn rate of use of the target group;

responsive to the monetization value for the target group being greater than at least a threshold value, continue maintaining, by the online system, the target group in the memory of the online system; and responsive to the monetization value for the target group being less than the threshold value, removing the target group from the memory of the online system.

8. The computer program product of claim 7, wherein determine the monetization value associated with the target group comprises:
 determine whether the content was selected for presentation to a user because the user was included in the target group and included in the new target group;
 allocate portions of an amount of revenue to the online system from presenting the content items to the user among the target group and the new target group; and
 determine the monetization value associated with the target group based at least in part on a portion of the amount of revenue to the online system from presenting the content to the user allocated to the target group.

9. The computer program product of claim 8, wherein allocate portions of the amount of revenue to the online system from presenting the content items to the user among the target group and the new target group comprises:
 determining total number of target groups that include the user based on the target group and the new target group;
 generating a value by dividing the amount of revenue to the online system from presenting the content items to the user by the total number of target groups; and
 allocating the value to the target group.

10. The computer program product of claim 9, wherein allocate portions of the amount of revenue to the online system from presenting the content to the user among the target group and the new target group further comprises:
 allocate the value to the new target group.

11. The method of claim 7, wherein determine the monetization value based at least in part on the determined ratio comprises:
 determine the monetization value as a difference between a value and the determined ratio.

* * * * *

UNITED STATES PATENT AND TRADEMARK OFFICE
CERTIFICATE OF CORRECTION

PATENT NO. : 10,402,865 B2
APPLICATION NO. : 14/586673
DATED : September 3, 2019
INVENTOR(S) : Gao et al.

Page 1 of 1

It is certified that error appears in the above-identified patent and that said Letters Patent is hereby corrected as shown below:

In the Claims

In Column 10, Claim 1, Line 63, delete "each the" and insert -- each --, therefor.

In Column 11, Claim 1, Line 24, delete "the the" and insert -- the --, therefor.

In Column 14, Claim 11, Line 12, delete "The method of claim 7," and insert -- The computer program product of claim 7, --, therefor.

Signed and Sealed this
Eighteenth Day of February, 2020

Andrei Iancu
*Director of the United States Patent and Trademark Office*